United States Patent
Kern et al.

(10) Patent No.: US 10,043,589 B2
(45) Date of Patent: Aug. 7, 2018

(54) DISPLAY DEVICE

(71) Applicant: Continental Automotive GmbH, Hannover (DE)

(72) Inventors: Thorsten Alexander Kern, Alsbach (DE); Robert Wolfgang Kissel, Egelsbach (DE); Ingo Zoller, Grossostheim (DE)

(73) Assignee: Continental Automotive GmbH, Hannover (DE)

( * ) Notice: Subject to any disclaimer, the term of this patent is extended or adjusted under 35 U.S.C. 154(b) by 255 days.

(21) Appl. No.: 15/100,862

(22) PCT Filed: Dec. 2, 2014

(86) PCT No.: PCT/EP2014/076238
§ 371 (c)(1),
(2) Date: Jun. 1, 2016

(87) PCT Pub. No.: WO2015/082463
PCT Pub. Date: Jun. 11, 2015

(65) Prior Publication Data
US 2016/0307648 A1     Oct. 20, 2016

(30) Foreign Application Priority Data

Dec. 4, 2013   (DE) ................ 10 2013 224 895

(51) Int. Cl.
*G12B 11/04*   (2006.01)
*H02K 33/16*   (2006.01)

(52) U.S. Cl.
CPC .............. *G12B 11/04* (2013.01); *H02K 33/16* (2013.01)

(58) Field of Classification Search
CPC ......... G12B 11/04; H02K 33/00; H02K 33/16
(Continued)

(56) References Cited

U.S. PATENT DOCUMENTS

| 3,727,041 A | 4/1973 | Scott | |
|---|---|---|---|
| 3,737,746 A * | 6/1973 | Cielaszyk | G04C 3/14 310/37 |

(Continued)

FOREIGN PATENT DOCUMENTS

| DE | 101 33 245 A1 | 10/2002 |
|---|---|---|
| DE | 103 31 443 A1 | 2/2005 |

(Continued)

*Primary Examiner* — Burton Mullins
(74) *Attorney, Agent, or Firm* — Cozen O'Connor

(57) ABSTRACT

A display device has a scale in the shape of a circular arc. On an axis driving an indicator axis, a rotatably mounted gear wheel is arranged in a rotatably fixed manner, in the teeth of which the toothing of a wobble gear ring partially engages. The wobble gear ring is mounted about the axis of the rotatably mounted gear wheel such that the wobble gear ring can wobble, is acted upon by spring forces distributed around the periphery of the wobble gear ring in the direction of engagement of the toothing of the wobble gear ring in the teeth of the rotatably mounted gear wheel, and is fixedly connected to a ferromagnetic ring extending in the direction of rotation of the wobble gear ring. At least two pole shoes project through independently energizable coils to the outer circumferential surface of the ferromagnetic ring.

19 Claims, 3 Drawing Sheets

(58) Field of Classification Search
USPC ..... 116/47, 51–52, 284, 309; 310/36, 49.22, 310/49.23, 49.47, 49.49, 49.51, 49.53; 362/23.18
See application file for complete search history.

(56) References Cited

U.S. PATENT DOCUMENTS

| | | | | |
|---|---|---|---|---|
| 5,514,960 | A * | 5/1996 | Taverner | B60K 35/00 310/156.45 |
| 5,546,888 | A * | 8/1996 | Skiver | G01D 11/28 116/284 |
| 5,603,283 | A * | 2/1997 | Owen | G01D 11/28 116/284 |
| 5,610,492 | A * | 3/1997 | Leung | H02K 37/04 310/49.23 |
| 5,780,944 | A * | 7/1998 | Sakamoto | H02K 37/14 310/156.26 |
| 6,014,075 | A | 1/2000 | Fujimori et al. | |
| 6,356,046 | B1 | 3/2002 | Koumura et al. | |
| 6,520,108 | B1 * | 2/2003 | Komura | G01D 11/02 116/284 |
| 6,640,743 | B2 | 11/2003 | Nakane | |
| 6,940,269 | B2 | 9/2005 | Kumura | |
| 6,994,053 | B2 * | 2/2006 | Abe | G01D 11/24 116/284 |
| 7,434,536 | B2 | 10/2008 | Suess et al. | |
| 7,520,242 | B2 * | 4/2009 | Vuilliomenet | G01D 11/24 116/284 |
| 7,573,255 | B2 | 8/2009 | Totsuka | |
| 8,347,807 | B2 | 1/2013 | Sigg et al. | |
| 8,365,680 | B2 | 2/2013 | Fukuda et al. | |
| 9,268,402 | B2 | 2/2016 | Kern et al. | |
| 2004/0261688 | A1 | 12/2004 | MacGregor et al. | |
| 2007/0194899 | A1 | 8/2007 | Lipman | |
| 2011/0114009 | A1 | 5/2011 | Fukuda et al. | |
| 2012/0106124 | A1 | 5/2012 | Okamoto et al. | |
| 2014/0000508 | A1 | 1/2014 | Liburdi et al. | |

FOREIGN PATENT DOCUMENTS

| | | |
|---|---|---|
| DE | 102007006850 A1 | 8/2007 |
| DE | 102011111543 A1 | 2/2013 |
| FR | 2790552 A1 | 9/2000 |
| JP | S 58-62224 | 4/1983 |
| JP | S 59-681 | 1/1984 |
| JP | H 05-312599 | 11/1993 |
| JP | H 08-159814 | 6/1996 |
| JP | H 10132857 A | 5/1998 |
| JP | 2001-194190 | 7/2001 |
| JP | 2002-323350 | 11/2002 |
| JP | 2006-525526 | 11/2006 |
| JP | 2010032251 A | 2/2010 |
| JP | 2011-095243 | 5/2011 |
| WO | WO 2006011146 A2 | 2/2006 |
| WO | WO 2007/138437 A2 | 12/2007 |

* cited by examiner

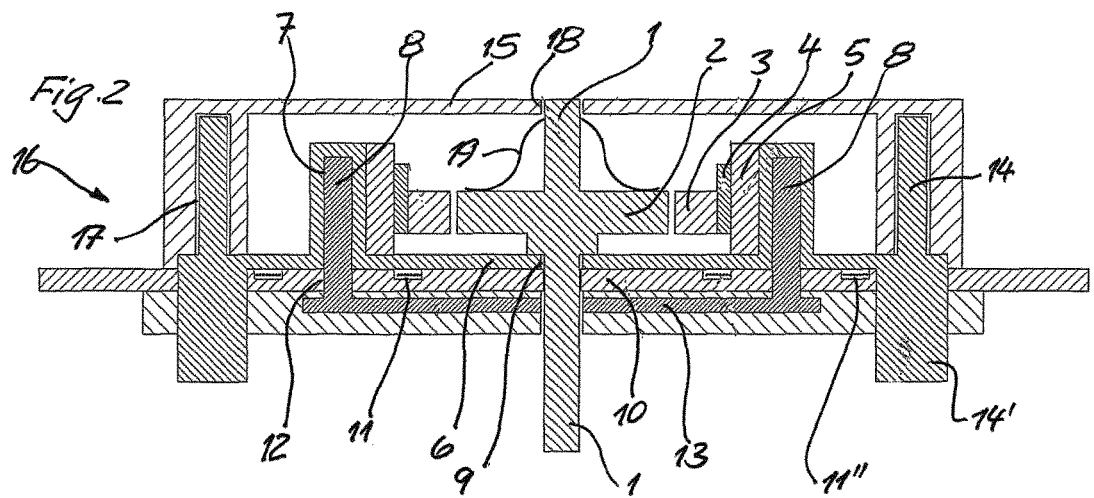
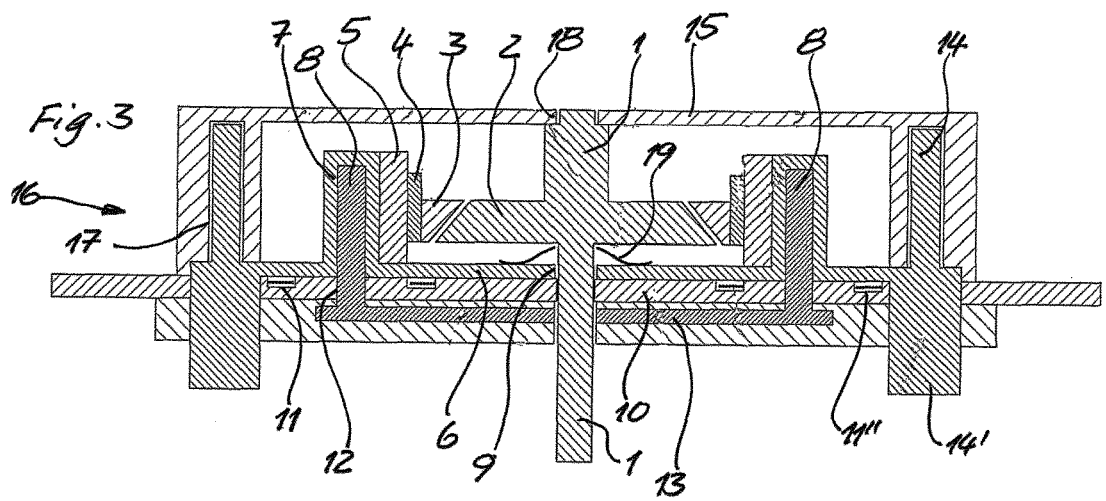
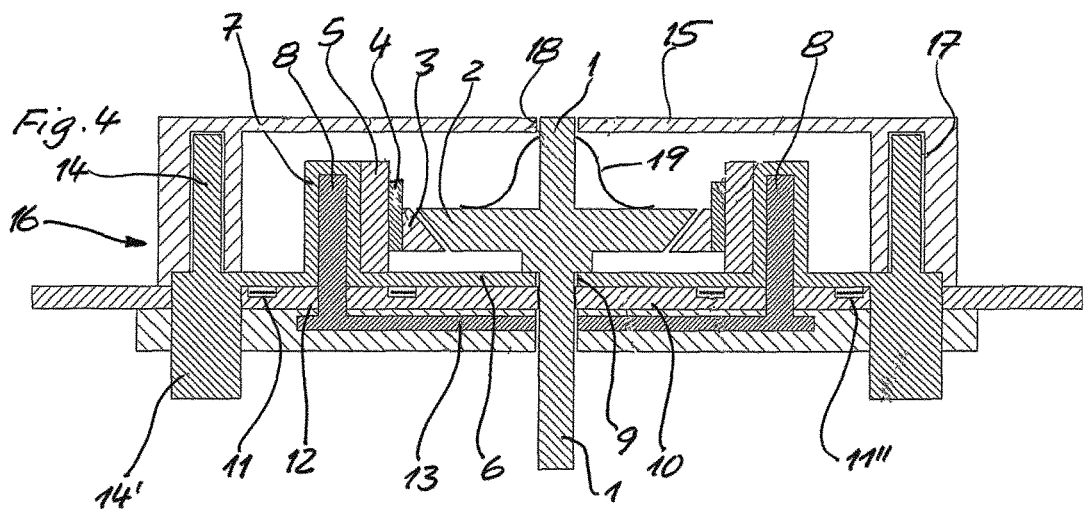

DISPLAY DEVICE

CROSS-REFERENCE TO RELATED APPLICATIONS

This is a U.S. national stage of application No. PCT/EP2014/076238, filed on 2 Dec. 2014, which claims priority to the German Application No. 10 2013 224 895.4 filed 4 Dec. 2013, the content of both incorporated herein by reference.

BACKGROUND OF THE INVENTION

1. Field of the Invention

The invention relates to a display device having a scale the shape of a circular arc, along which the free end of an indicator rotatably drivable about an indicator axis is movable.

2. Related Art

In the case of display devices of this type, meter movements, which are mounted on conductor boards and are pressure or solder contacted, having integrated electromagnetic drive systems that contain a permanent magnet, wound coils, and a more or less complex ferromagnetic circuit are known. The rotation movement generated here is converted by a single-stage or multi-stage gearbox to a movement of the indicator axis. This leads to high manufacturing costs. Uniformity of the movement of the indicator has to be generated by a corrective actuation curve.

SUMMARY OF THE INVENTION

It is therefore an object of the invention to provide a display device of the type mentioned at the outset that enables a cost-effective and simple construction, having few components, and uniform movement of the indicator.

According to an aspect of the invention, this object, in a first embodiment, is achieved in that a rotatably mounted gear wheel is disposed so as to be rotationally fixed on an axle that directly or indirectly drives the indicator axis, the toothing of a tumbling gear ring having a diameter larger than that of the gear wheel partially engaging in the teeth of the gear wheel, the tumbling gear ring being mounted so as to be capable of tumbling about the axle of the gear wheel, and the tumbling gear ring being impinged by spring forces distributed across the circumference of the former and act in the engagement direction of the toothing of the tumbling gear ring with the teeth of the gear wheel and being fixedly connected to a ferromagnetic ring that extends in the circumferential direction of the tumbling gear ring, having at least two pole shoes that protrude through coils, which are capable of being energized in a mutually independent manner, to the external revolving girthed area of the ferromagnetic ring and, having a radial clearance in relation to the ferromagnetic ring, are distributed on the circumference of the ferromagnetic ring.

According to another aspect of the invention, the object, in a second embodiment, is achieved in that a rotatably mounted internal gear ring is disposed so as to be rotationally fixed on an axle that directly or indirectly drives the indicator axis, the toothing of a tumbling external gear ring having a smaller diameter than the internal gear ring partially engaging in the teeth of the internal gear ring, the tumbling external gear ring being mounted so as to be capable of tumbling about the axis of the internal gear ring, and the tumbling external gear ring being impinged by spring forces distributed across the circumference of the former and act in the engagement direction of the toothing of the tumbling external gear ring with the teeth of the internal gear ring and being fixedly connected to a ferromagnetic ring that extends in the circumferential direction of the tumbling external gear ring, having at least two pole shoes that protrude through coils, which are capable of being energized in a mutually independent manner, to the internal revolving girthed area of the ferromagnetic ring and, having a radial clearance in relation to the ring, are distributed on the circumference of the ferromagnetic ring.

By driving the axle by a tumbling gear ring or a tumbling external gear ring, high gearing using a few simple components is possible, leading to uniform movement of the indicator.

If the tumbling gear ring or the tumbling external gear ring are configured so as to be integral with the ferromagnetic ring, this leads to a cost-effective reduction of the components and to simplification of assembly.

A further reduction in the number of components and in the assembly effort is achieved in that the coils are planar coils that are attached to a conductor board and that enclose passage openings in the conductor board, the pole shoes protruding therethrough. This also reduces the construction space of the display device. Here, the conductor board supporting the coils is simultaneously an integral component part of the meter movement.

Depending on the prevailing space conditions, the gear wheel and the tumbling gear ring or the internal gear ring and the tumbling external gear ring may be spur gears or bevel gears.

A configuration that reduces the number of components and thus also the assembly effort is achieved when the pole shoes are connected to a pole plate that extends approximately perpendicularly to the pole shoes, the pole shoes and the pole plate potentially being configured so as to be integral.

Depending on the space conditions, the pole shoes may extend at least approximately perpendicularly to the tooth engagement direction of the tumbling gear ring or of the tumbling external gear ring with the gear wheel or the internal gear ring, respectively, or may extend so as to be at least approximately identically aligned in relation to the tooth engagement direction of the tumbling gear ring or of the tumbling external gear ring, respectively, with the gear wheel or the internal gear ring, respectively.

In order for the engagement of the tumbling gear ring or of the tumbling external gear ring with the teeth of the gear wheel to be ensured in a simple manner, the tumbling gear ring or the tumbling external gear ring, respectively, on that side thereof that faces away from the engagement side of the toothing of the tumbling gear ring with the teeth of the gear wheel, may be supported by one or a plurality of elastic elements.

Here, the tumbling gear ring or the tumbling external gear ring, respectively, by way of the ferromagnetic ring may bear on the elastic elements.

In order to achieve high ruggedness in relation to assembly influences, the meter movement composed of the gear wheel, the axle, the tumbling gear ring, the ferromagnetic ring, and the elastic elements may be disposed in a housing, the meter movement in particular being encapsulated by the housing.

In order for the pole shoes to be separated from the interior of the housing, the base may have pockets that receive the pole shoes protruding into the interior of the housing.

Here, a space-saving, compact construction is achieved in that the conductor board bears on that side of the base that faces away from the interior of the housing, the pole plate preferably being disposed on that side of the conductor board that faces away from the housing.

For mechanical protection, the conductor board and/or the pole plate are preferably fully or partially insert-molded with a plastic covering.

BRIEF DESCRIPTION OF THE DRAWINGS

Exemplary embodiments of the invention are illustrated in the drawings and will be explained in more detail hereunder. In the drawings:

FIG. 2 shows a first exemplary embodiment of a display device in cross section;

FIG. 3 shows a second exemplary embodiment of a display device in cross section;

FIG. 4 shows a third exemplary embodiment of a display device in cross section;

DETAILED DESCRIPTION OF THE PRESENTLY PREFERRED EMBODIMENTS

Figure 1:
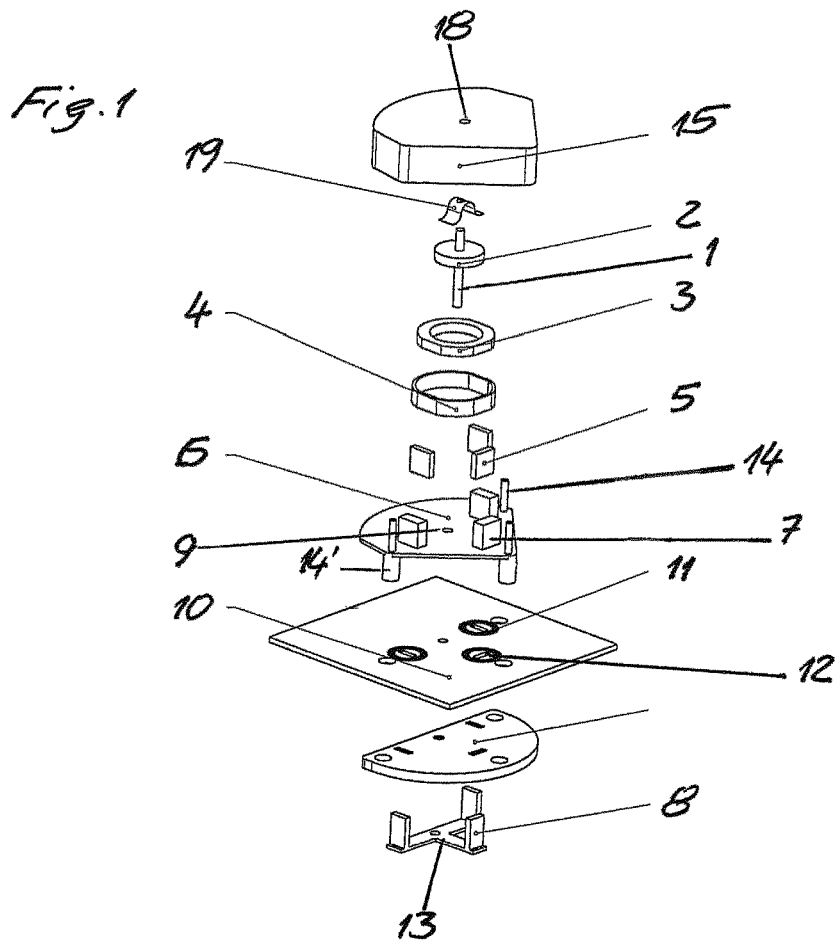
FIG. 1 shows a perspective illustration of the in-principle construction of a display device.

The display devices illustrated in the figures have a rotatably mounted axle 1, a gear wheel 2 being fixedly disposed thereon. The teeth of a tumbling gear ring 3 forming an internal gear ring engage in part of the teeth of the gear wheel 2, the tumbling gear ring 3 having a larger internal diameter than the gear wheel 2. The rotationally fixed tumbling gear ring 3, on an annular face that does not have the toothing, is provided with a ferromagnetic ring 4 which, by way of elastic elements 5 on pole shoes 8, which are disposed in pockets 7 of a base 6, is supported in such a manner that the tumbling gear ring 3 can move in a tumbling manner about the gear wheel.

The gear wheel 2 and the tumbling gear ring 3 have different numbers of teeth such that, in the case of a circularly revolving tumbling movement of the rotationally fixed tumbling gear ring 3, the gear wheel 2 is driven to perform a rotation movement. The pole shoes 8 extend approximately perpendicularly (FIGS. 2, 3, 4) or identically aligned (FIGS. 5, 6, 7) in relation to the tooth engagement direction of the tumbling gear ring with the gear wheel 2.

The plate-type base 6, which is configured as a plastic injection-molded part, extends so as to be parallel with the gear wheel 2 and has a first bearing opening 9, the axle 1 on the one side of the gear wheel 2 being rotatably mounted therein.

A conductor board 10, three planar coils 11 being attached to that side thereof that faces toward the base, bears on that side of the base 6 that faces away from the gear wheel 2. A passage opening 12 is configured in the conductor board 10 so as to be centric within each planar coil 11, one of the pole shoes 8 protruding through each of the passage openings 12 into one of the pockets 7 of the base 6.

The pole shoes 8, the pockets 7, the passage openings, and the planar coils 11 are disposed so as to be uniformly distributed on a semicircle 20.

On that side of the conductor board 10 that faces away from the gear wheel 2, the pole shoes 8, by way of a pole plate 13, which extends perpendicularly to the pole shoes 8, are interconnected to form a single component, the pole plate 13 extending so as to be parallel with the conductor board 10.

The base 6, radially outward of the pockets 7, has fastening pins 14, 14' which extend on both sides of the plane of the base 6, so as to be parallel with the axle 1.

The meter movement, which is composed of the gear wheel 2, the axle 1, the tumbling gear ring 3, the ferromagnetic ring 4, and the elastic elements 5, is encapsulated in a housing 16, which is composed of the base 6 and of a cup-type cover 15. Fastening recesses 17, which are open toward the opening periphery of the wall of the cover 15, are configured in the radially encircling wall of the cover 15. In order for the housing 16 to be closed, the cover 15 is pulled over the meter movement until the opening periphery of the cover 15 bears on the base 6, the fastening pins being introduced in a clamping manner into the fastening recesses 17.

Other suitable connection types may also be applied for connecting the cover 15 to the base 6, and for connecting the conductor board 10 to the base 6.

The free end of the axle 1, which faces away from the conductor board 10, is simultaneously introduced into a second bearing opening 18, which is configured in the base of the cover 15 and in which the axle 1 is rotatably mounted.

For supporting the axle 1 on the base 6 or on the base of the cover 15, respectively, and thus axially positioning the axle in a defined manner in the housing 16, the axle 1 is impinged by a compression spring 19, which is supported on the base of the cover 15 or on the base 6, respectively, and which impinges the gear wheel 2.

The pole plate 13, in a plate-type manner and so as to be parallel with the conductor board 10, is insert-molded with a plastic covering 21 which also encloses those ends of the fastening pins 14' of the base 6 that face away from the gear wheel 2.

In the exemplary embodiment of FIG. 2 the gear wheel 2 and the tumbling gear ring 3 are spur gears, the tumbling gear ring 3, the ferromagnetic ring 4, and the elastic elements 5 being disposed so as to be radial to the gear wheel 2 and being fastened in a radial manner as an interconnected group of components to the pockets 7 of the base 6.

With the exception of the configuration of the gear wheel 2 and of the tumbling gear ring 3 as bevel gears, the construction as in FIGS. 3 and 4 corresponds to that in FIG. 2, the teeth of the gear wheel 2 in FIG. 3 being aligned in an oblique manner away from the base 6, and in FIG. 4 being aligned in an oblique manner toward the base 6.

Figure 5:
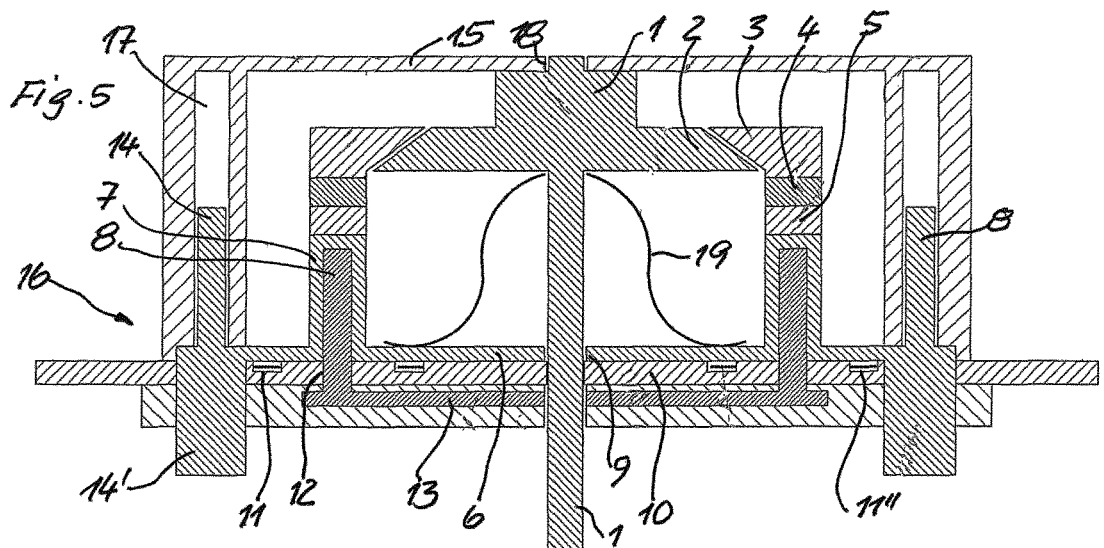
FIG. 5 shows a fourth exemplary embodiment of a display device in cross section.
Figure 6:
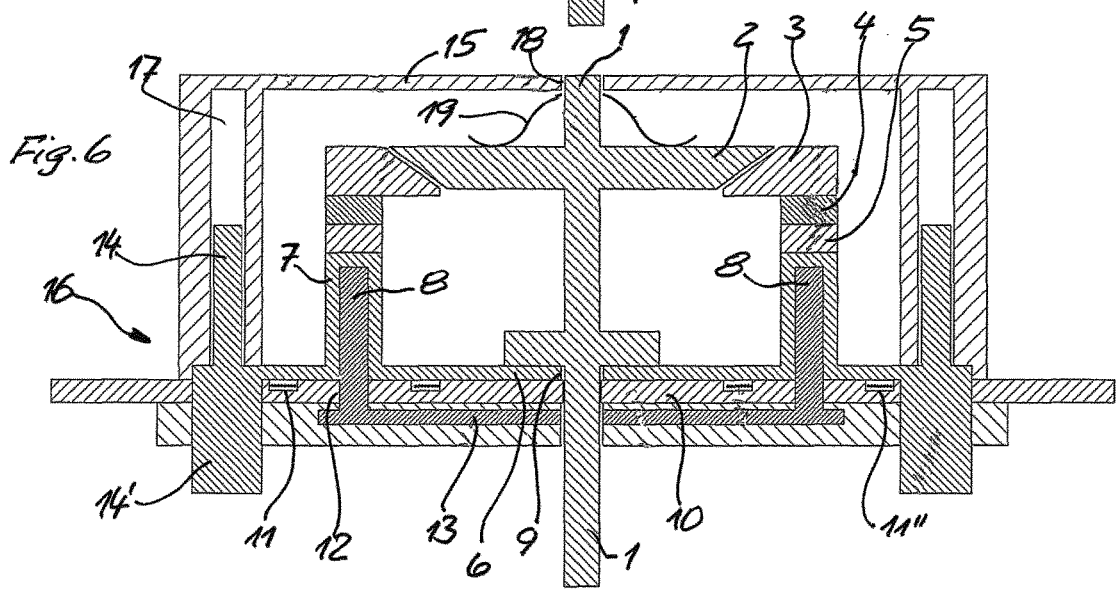
FIG. 6 shows a fifth exemplary embodiment of a display device in cross section.

The gear wheels 2 and the tumbling gear rings 3 in FIGS. 5 and 6 correspond to those in FIGS. 3 and 4.

However, the tumbling gear rings 3 by way of the ferromagnetic ring 4 and the elastic elements 5 are connected to the free end side of the pockets 7 of the base 6, so as to be axial in relation to the axle 1.

Figure 7:
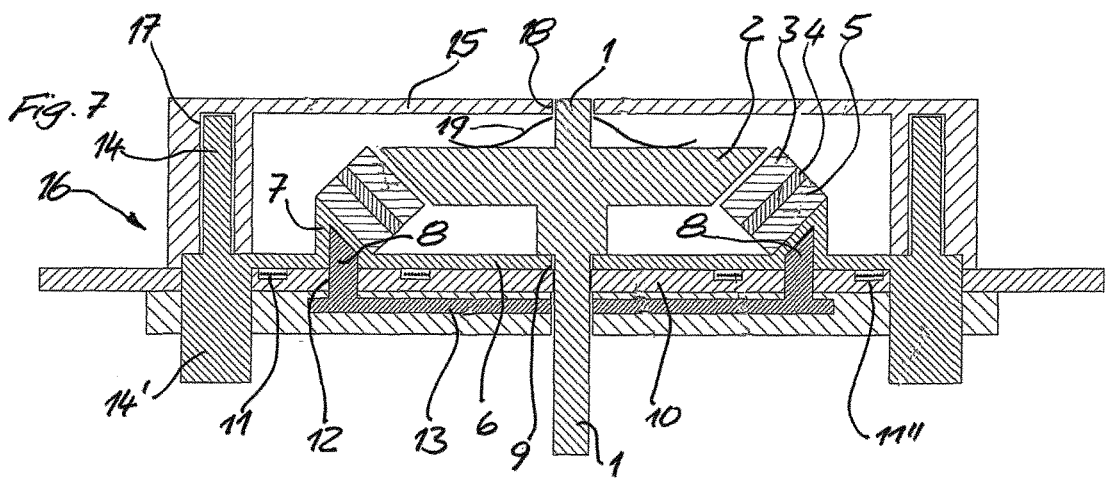
FIG. 7 shows a sixth exemplary embodiment of a display device in cross section.

The gear wheel 2 and the tumbling gear ring 3 in FIG. 7 are configured as bevel gears, in a manner corresponding to FIG. 4. The tumbling gear ring 3 by way of the ferromagnetic ring 4 and the elastic elements 5 is connected in a manner corresponding to the bevel angle of the bevel gears to the pockets 7 of the base 6.

Figure 8:
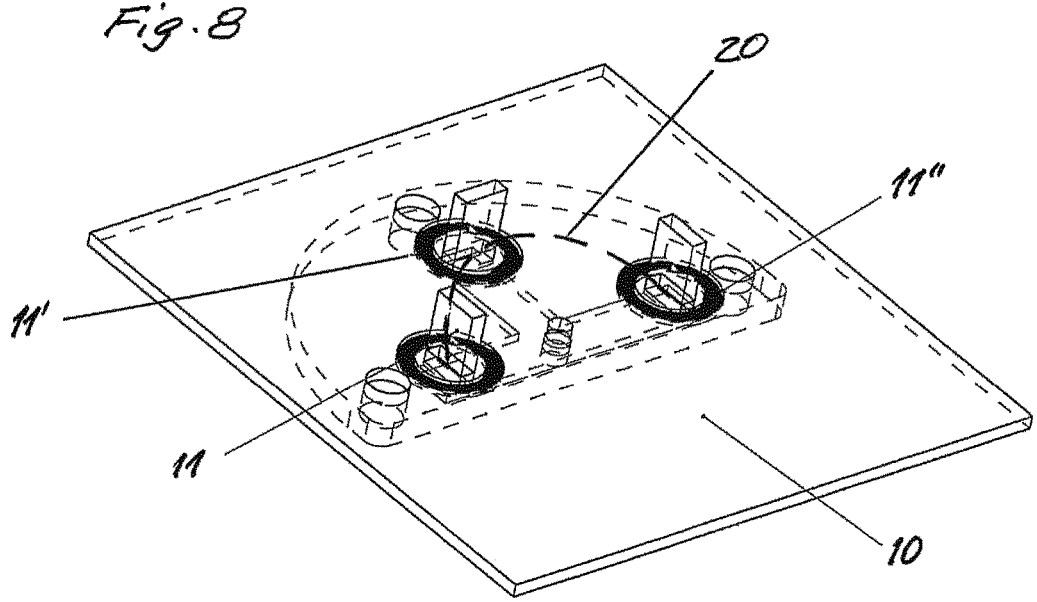
FIG. 8 shows a perspective view of a conductor board.

As can be seen in FIG. 8, the planar coils 11 on the conductor board 10 are disposed so as to be uniformly distributed on a semicircle 20 and are protruded through by the pole shoes 8. The planar coils 11 are dissimilarly energized by a controller (not shown) in such a manner that correspondingly dissimilar magnetic fields act on the pole shoes 8 onto the ferromagnetic ring 4, deflecting the latter in a correspondingly dissimilar manner, counter to the force of the elastic elements 5, from the illustrated neutral position of the ferromagnetic ring 4. The tumbling gear ring 3 is deflected in a corresponding manner.

In the home position of the axle 1, that planar coil 11 that is located at the left end of the semicircle 20 is impinged by the strongest current, and that planar coil 11" that is located at the right end of the semicircle 20 is impinged by the weakest current, and the central planar coil 11' is impinged with an intermediate current.

If the impingement with current on the left planar coil 11 is now increased to the same extent as the impingement of current on the right planar coil 11" is reduced, the magnetic fields of the planar coils are modified in a corresponding manner, leading to a tumbling movement of the ferromagnetic ring 4 and conjointly of the tumbling gear ring 3 along the semicircle 20. On account thereof, the gear wheel 2 is driven by the tumbling gear ring 3 to perform a rotation movement which, by way of the likewise rotating axle 1, is transmitted to an indicator axis (not illustrated). The indicator disposed on the indicator axis then moves in a corresponding manner along a scale (likewise not illustrated) having the shape of an arc.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A display device having a scale shaped in a circular arc, along which arc a free end of an indicator rotatably drivable about an indicator axis is movable, the display device comprising:
   an axle (1) configured to directly or indirectly drive the indicator;
   a rotatably mounted gear wheel (2) having teeth and being arranged so as to be rotationally fixed on the axle (1);
   a tumbling gear ring (3) having a toothing, the toothing of the tumbling gear ring (3) having a diameter larger than that of the rotatably mounted gear wheel (2) so as to partially engage in the teeth of said gear wheel (2), the tumbling gear ring (3) being mounted so as to be capable of tumbling about the axle (1) of the rotatably mounted gear wheel (2), and said tumbling gear ring (3) being impinged by spring forces that are distributed across the circumference of the rotatably mounted gear wheel (2) and that act in an engagement direction of the toothing of the tumbling gear ring (3) with the teeth of the rotatably mounted gear wheel (2);
   a ferromagnetic ring (4), to which the tumbling gear ring (3) is fixedly connected, the ferromagnetic ring (4) extending in a circumferential direction of the tumbling gear ring (3);
   a plurality of coils; and
   at least two pole shoes (8) arranged so as to protrude through the coils to an external revolving girthed area of the ferromagnetic ring (4) and the at least two pole shoes (8) have a radial clearance in relation to the ferromagnetic ring (4) and are distributed on the circumference of the ferromagnetic ring (4),
   wherein the coils are energizable in a mutually independent manner.

2. A display device having a scale shaped in a circular arc, along which arc a free end of an indicator rotatably drivable about an indicator axis is movable, the display device comprising:
   an axle configured to directly or indirectly drive the indicator;
   a rotatably mounted internal gear ring having teeth and being arranged so as to be rotationally fixed on the axle;
   a tumbling external gear ring having a toothing, the toothing of the tumbling exterior gear ring having a smaller diameter than the internal gear ring so as to partially engage in the teeth of said internal gear ring, the tumbling external gear ring being mounted so as to be capable of tumbling about the axis of the internal gear ring, and said tumbling external gear ring being impinged by spring forces that are distributed across the circumference of the internal gear ring and that act in an engagement direction of the toothing of the tumbling external gear ring with the teeth of the internal gear ring;
   a ferromagnetic ring, to which the tumbling external gear ring is fixedly connected, the ferromagnetic ring extending in the circumferential direction of the tumbling external gear ring;
   a plurality of coils; and
   at least two pole shoes arranged so as to protrude through coils to an internal revolving girthed area of the ferromagnetic ring and the at least two pole shoes have a radial clearance in relation to the ferromagnetic ring and are distributed on the circumference of the ferromagnetic ring,
   wherein the coils are energizable in a mutually independent manner.

3. The display device as claimed in claim 1, wherein the tumbling gear ring (3) is configured so as to be integrally formed with the ferromagnetic ring (4).

4. The display device as claimed in claim 1, wherein the coils are planar coils (11, 11', 11") which are attached to a conductor board and which enclose passage openings (12) in the conductor board (10), the pole shoes (8) protruding therethrough.

5. The display device as claimed in claim 1, wherein the rotatably mounted gear wheel (2) and the tumbling gear ring (3) are spur gears.

6. The display device as claimed in claim 1, wherein the rotatably mounted gear wheel (2) and the tumbling gear ring (3) are bevel gears.

7. The display device as claimed in claim 4, wherein the pole shoes (8) are connected to a pole plate (13) which extends approximately perpendicularly to the pole shoes (8).

8. The display device as claimed in claim 7, wherein the pole shoes (8) and the pole plate (13) are formed integrally.

9. The display device as claimed in claim 1, wherein the pole shoes (8) extend at least approximately perpendicularly to the tooth engagement direction of the tumbling gear ring (3) with the rotatably mounted gear wheel (2).

10. The display device as claimed in claim 1, wherein the pole shoes (8) extend so as to be at least approximately identically aligned in relation to the tooth engagement direction of the tumbling gear ring (3) with the rotatably mounted gear wheel (2).

11. The display device as claimed in claim 7, wherein the tumbling gear ring (3), on a side of the tumbling gear ring (3) facing away from an engagement side of the toothing of the tumbling gear ring (3) with the teeth of the rotatably mounted gear wheel (2), is supported by one or a plurality of elastic elements (5).

12. The display device as claimed in claim 11, wherein the tumbling gear ring (3), by way of the ferromagnetic ring (4), bears on the elastic elements (5).

13. The display device as claimed in claim 12, further comprising a meter movement arranged in a housing (16), the meter movement having: the rotatably mounted gear wheel (2), the axle (1), the tumbling gear ring (3), the ferromagnetic ring (4), and the elastic elements (5).

14. The display device as claimed in claim 13, wherein the meter movement is encapsulated by the housing (16).

15. The display device as claimed in claim 14, wherein the housing (16) comprises a base (6) and a cover (15).

16. The display device as claimed in claim 15, wherein the pole shoes (8) protrude into the interior of the housing (16), and wherein the base (6) has pockets (7) configured to receive the protruding pole shoes (8).

17. The display device as claimed in claim 16, wherein the conductor board (10) bears on a side of the base (6) facing away from the interior of the housing (16).

18. The display device as claimed in claim 17, wherein the pole plate (13) is disposed on a side of the conductor board (10) facing away from the housing (16).

19. The display device as claimed in claim 18, wherein the conductor board (10) and/or the pole plate (13) are fully or partially insert-molded with a plastic covering (21).

\* \* \* \* \*